No. 812,123. PATENTED FEB. 6, 1906.
A. A. FORBES.
MACHINE FOR MOLDING BUILDING BLOCKS.
APPLICATION FILED MAR. 31, 1905.

5 SHEETS—SHEET 1.

Witnesses:
W. H. Williams
E. M. Bowel

Inventor:
Alexander A. Forbes,
by: F. S. Bradbury, Attorney.

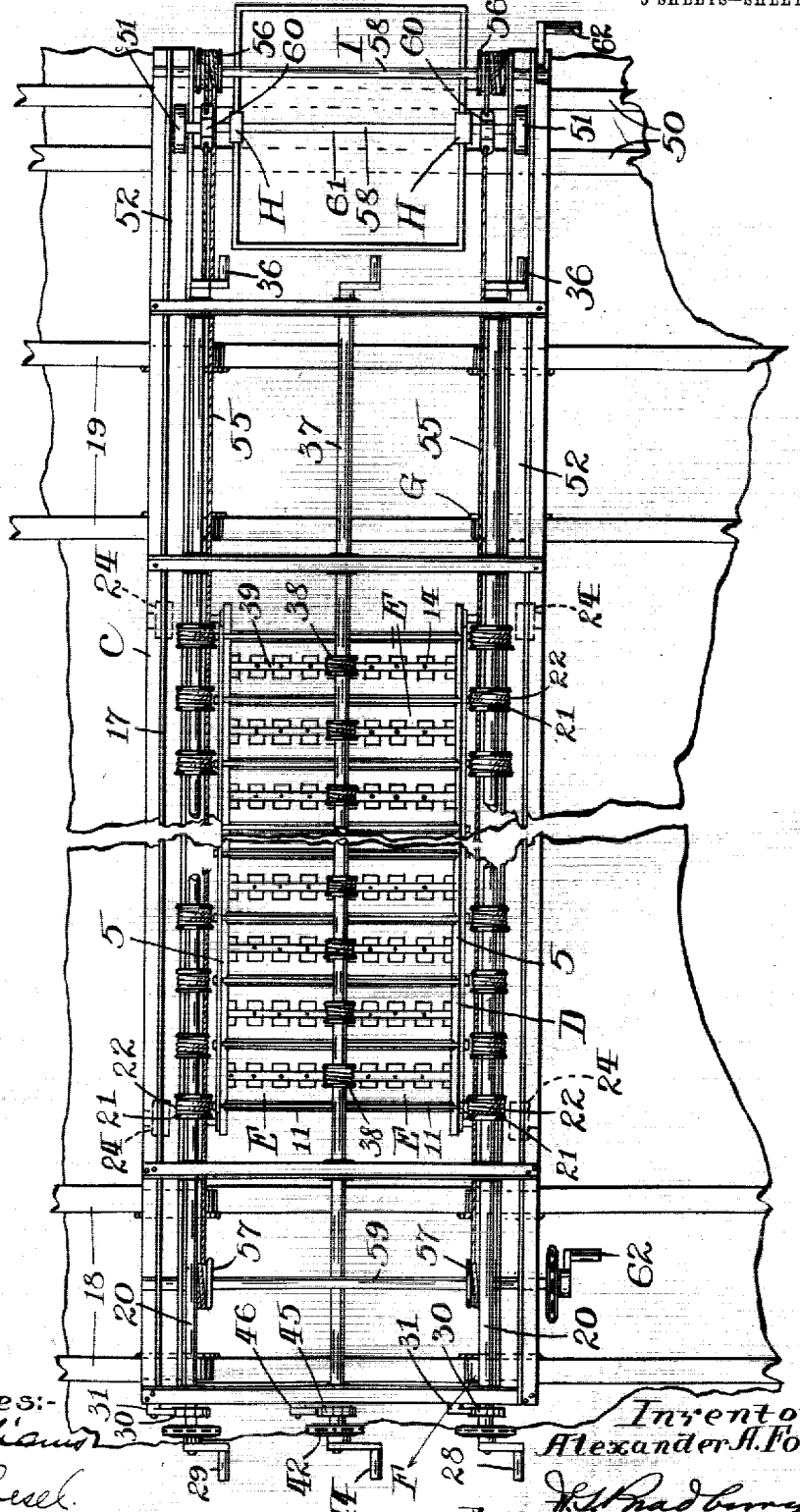

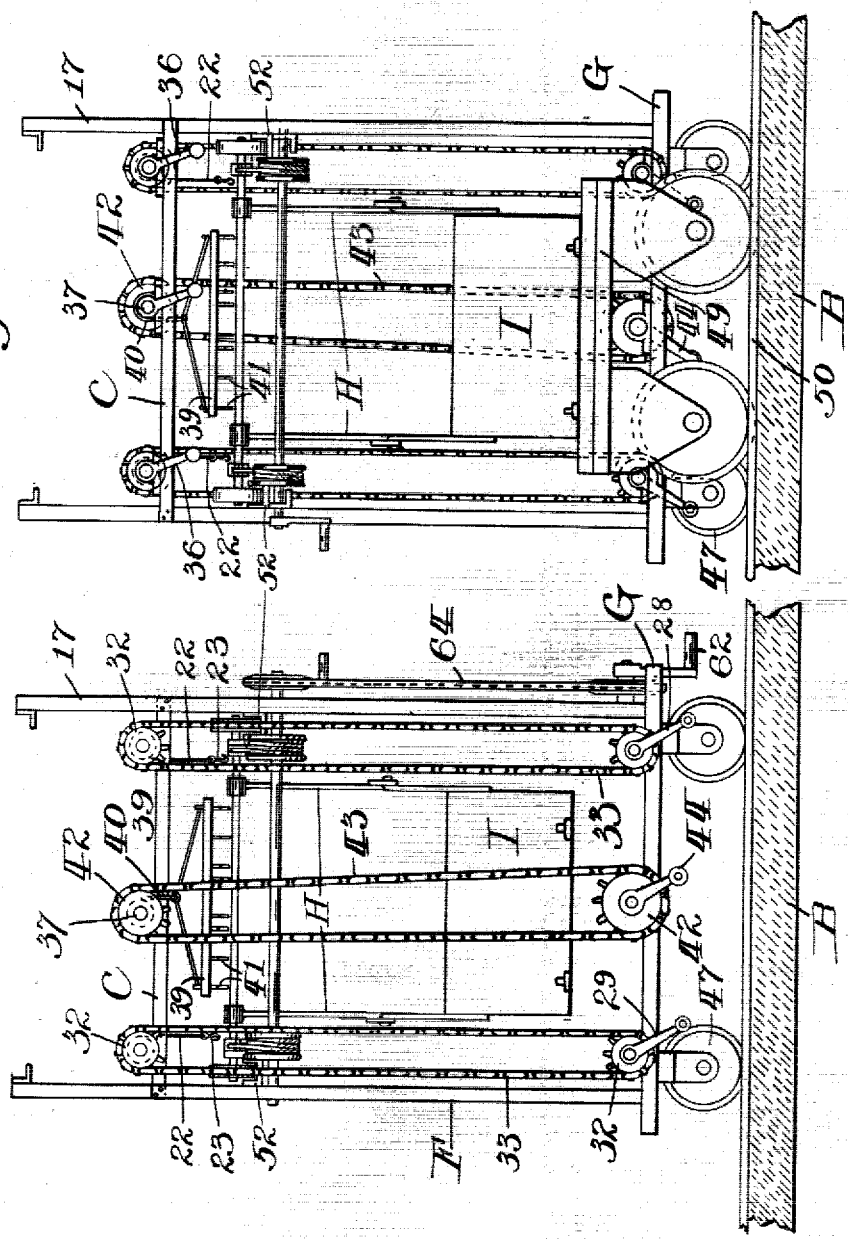

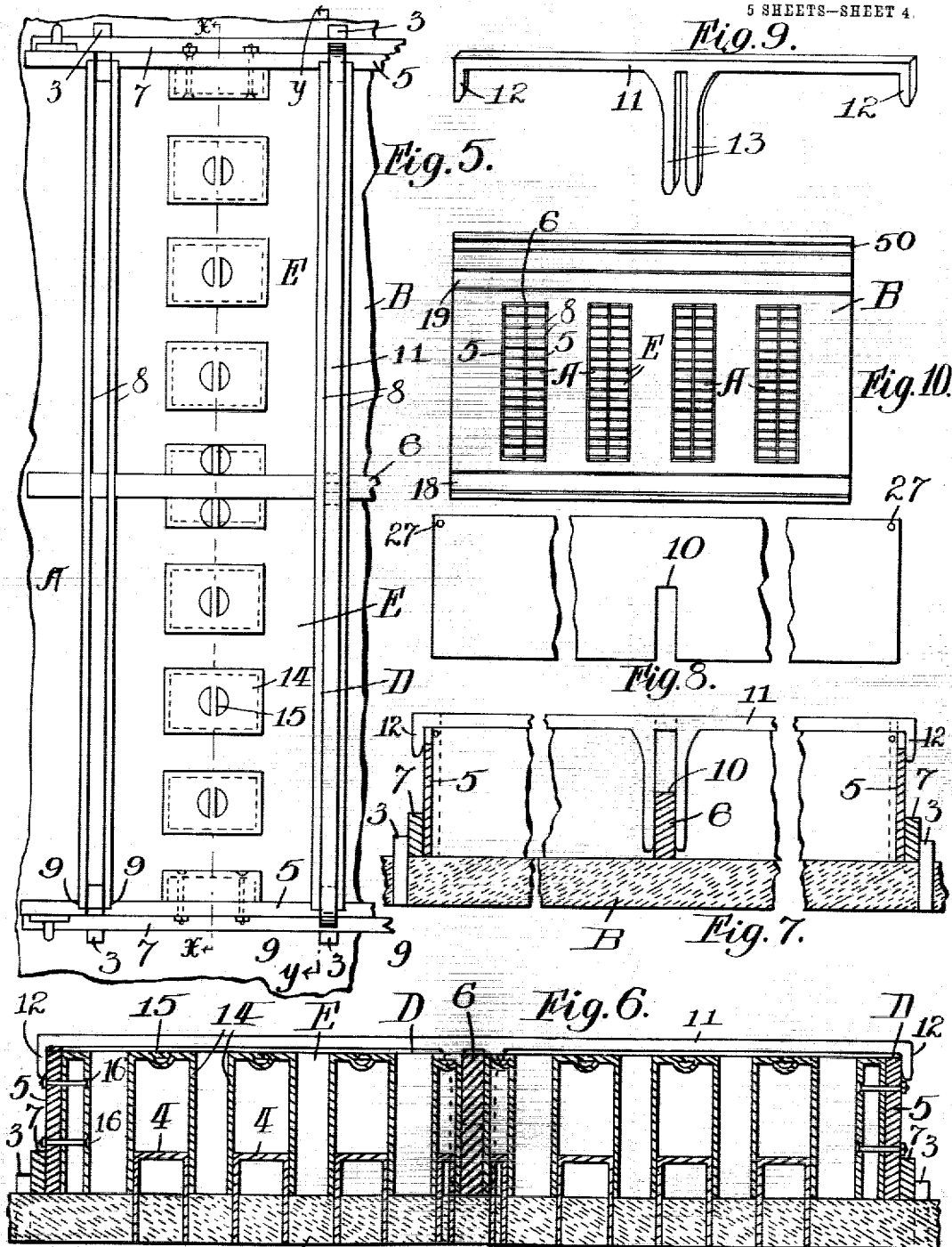

No. 812,123. PATENTED FEB. 6, 1906.
A. A. FORBES.
MACHINE FOR MOLDING BUILDING BLOCKS.
APPLICATION FILED MAR. 31, 1905.

5 SHEETS—SHEET 5.

Witnesses:
W. H. Williams
E. M. Bouel

Inventor:
Alexander A. Forbes,
by: F. G. Bradbury.
Attorney.

UNITED STATES PATENT OFFICE.

ALEXANDER A. FORBES, OF DULUTH, MINNESOTA.

MACHINE FOR MOLDING BUILDING-BLOCKS.

No. 812,123.    Specification of Letters Patent.    Patented Feb. 6, 1906.

Application filed March 31, 1905. Serial No. 253,033.

*To all whom it may concern:*

Be it known that I, ALEXANDER A. FORBES, a citizen of the United States, residing at Duluth, in the county of St. Louis and State of Minnesota, have invented a new and useful Machine for Molding Building-Blocks, of which the following is a specification.

My invention relates to improvements in machines for molding building-blocks, and has among its objects the saving of time and labor, reduction of cost of manufacture, greater effectiveness in use, the production of a higher grade building-block, and a machine for making a number of blocks during a single operation.

The output of a single block-molding machine is very limited, because good cements require about two hours to set before the block can be removed from the mold, and much hand-labor is necessary in filling and tamping the molding material in the mold-frame. With my invention this time and labor are greatly reduced, the output of building-blocks increased, and the number of parts necessary in the mold-frame reduced.

Figure 1:
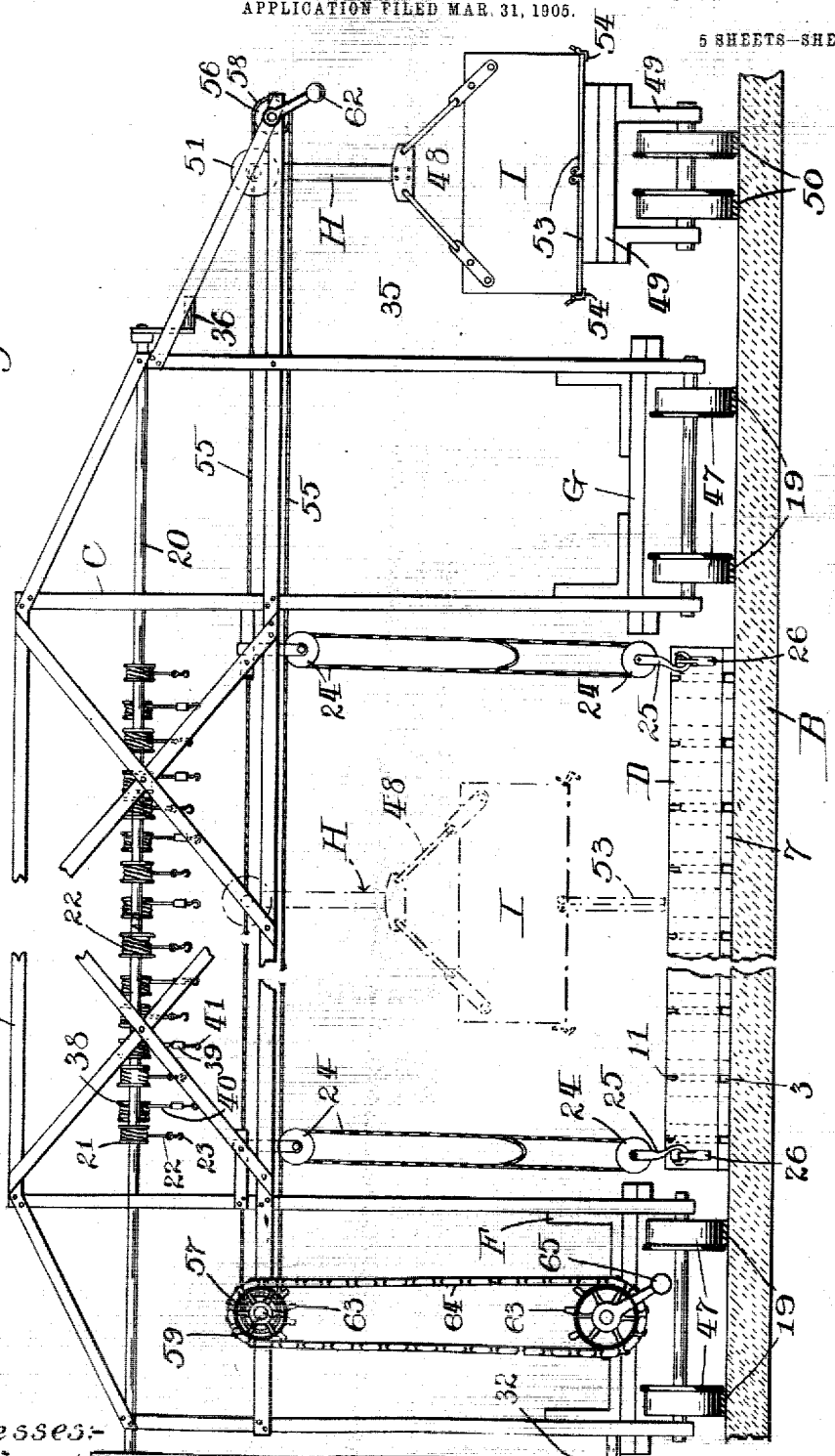
Figure 11:
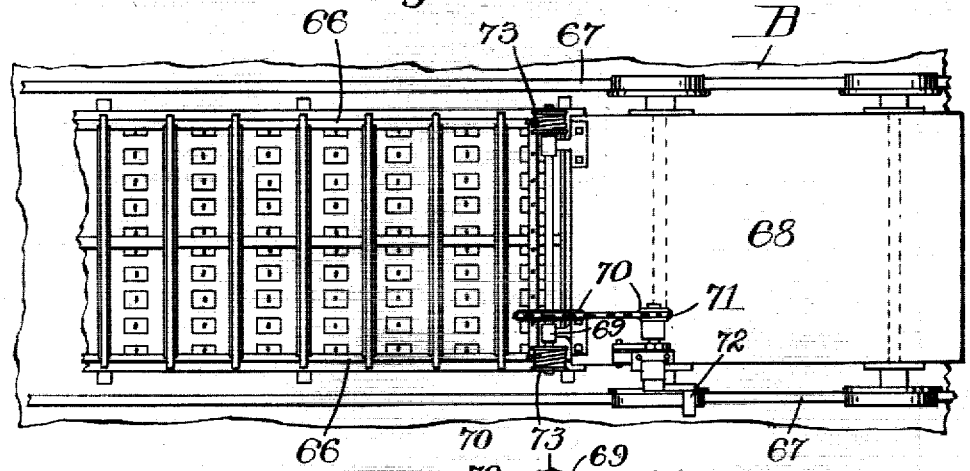
Figure 12:
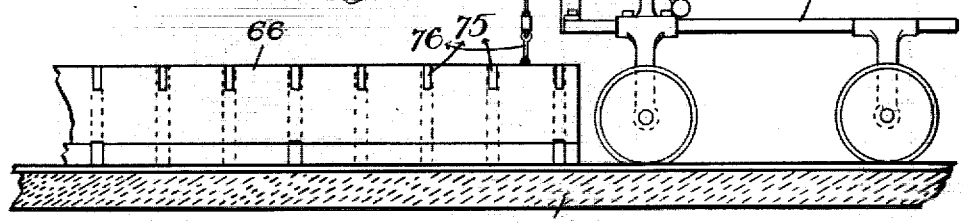
Figure 13:
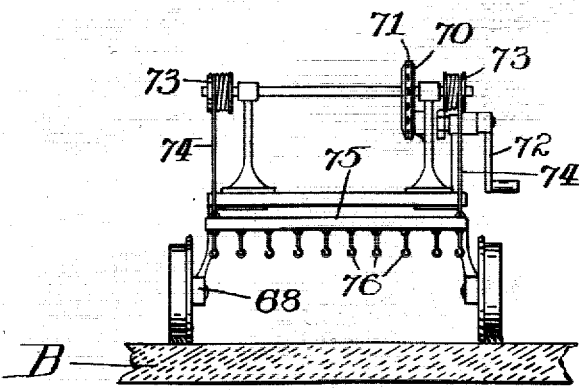

In the accompanying drawings, forming part of this specification, Figure 1 is a side elevation, partly broken away, of my machine. Fig. 2 is a plan view of Fig. 1, showing a portion of the base in section. Figs. 3 and 4 are end views showing a portion of the base in section. Fig. 5 is a detail plan view of one of the mold-frames. Fig. 6 is a section of Fig. 5, taken on the line X X, showing the clamp in position to be lowered in place. Fig. 7 is a detail sectional view of Fig. 5, taken on the line Y Y, portions thereof being broken away. Fig. 8 is a view of one of the transverse division sides of the mold-frame, portions thereof being broken away. Fig. 9 is a perspective view of one of the clamps used for locking the sides of the mold-frame together. Fig. 10 is a diagrammatic plan view of a system of mold-forms as used with my invention. Fig. 11 is a detail plan view of an alternate construction. Fig. 12 is a side view of Fig. 11, and Fig. 13 is an end view of Fig. 12.

In a general way my invention consists of a series of mold-forms A, arranged in a row on a base B, and a traveler C, which is adapted to move above said mold-forms to supply them with molding material (such as concrete) and to remove the mold-frames from said base after said frames have been filled with molding material and tamped. Said mold-forms are adapted to be operated in relays, so that while the molding material is setting in one form the traveler is repeating its operation upon another form and no time is lost, the operation of molding being substantially continuous.

The base B is made of concrete, wood, or any other suitable material and is formed with mold-core holders 4 and a series of stops 3, which are adapted to assist in holding the parts of each mold-frame D.

Each mold-frame consists of parallel sides 5, between which is a longitudinal parting-wall 6. These sides and wall rest upon the base, said sides being adjacent to the longitudinal strips 7, which in turn impinge against the stops 3, as shown. Transverse division sides 8 are arranged across the spaces between the longitudinal sides of the mold-frame to divide the same into a plurality of molds, each mold E being adapted to form a building-block. The division sides are arranged in pairs, as shown, and are held in place by means of gains 9 in the longitudinal sides and notches 10 in the division sides and parting-wall 6, said notches permitting these latter parts to intermesh and lock. A clamp 11 is adapted to fasten the longitudinal sides of the mold-frame against the ends of the division sides by means of its shoulders 12 and to impinge against the sides of the parting-wall 6 by means of its arms 13. The body of the clamp and its arms 13 are adapted to pass between the division sides 8 to hold them separated and reinforce their strength.

In each mold E is a series of core-holders 4. Each core-holder is formed on the base by a shell, which is cast or otherwise fastened thereto. The core 14 is hollow and adapted to fit on a core-holder and is formed with a hook-engaging piece 15 for the purposes to be hereinafter described.

All of the parts of the mold-frame, including the mold-cores, are flush on top, so that the molds may be filled with concrete or other molding material, tamped, and said material evened off on the surface to mold the building-block or other desired article. The cores adjoining the longitudinal sides of the mold-frame are fastened thereto by means of bolts 16 and are not supported by core-holders upon the base. This construction may, however, be changed and these end cores held in place by core-holders on the base when desired.

To remove the sides of the mold-frames and cores is provided the traveler C, which is constructed as follows: Trucks F and G, forming terminals of an overhead bridge-frame 17, are adapted to move upon the tracks 18 and 19, which are parallel with and arranged on each side of the series of mold-forms A, as shown in Fig. 10. The overhead bridge-frame spans across the row of mold-forms and is skeleton in form and built integral with each terminal truck. On this frame is a pair of longitudinal shafts 20, each shaft being provided with a series of cable-drums 21; one drum for each end of each pair of division sides 8. Each drum has a winding-cable 22, upon the free end of which is a hook 23. When all of the sides of the mold-frame are released by removing the clamps 11, the longitudinal sides are lifted by the pulley-blocks and chains 24, which are fastened to any convenient part of the overhead bridge-frame 17. The lower pulley-blocks carry hooks 25, which are passed through loops 26 upon each end of each longitudinal side. Each set of pulley-blocks and chains is operated to lift the longitudinal sides from the base and above the molded blocks. Said sets of pulleys and chains are of ordinary construction and are adapted to hold the sides in raised position. When the longitudinal sides are lifted, the division sides forming each pair collapse. The hooks 23 are passed through holes 27 in the ends of each pair of division sides, and by turning the cranks 28 and 29 the drums 21 are revolved and wind their respective cables. This operation raises the division sides above the molded blocks. Ratchet-wheels and dogs 30 and 31 on each of the shafts 20 prevent the division sides from lowering. The cranks 28 are connected with the shafts 20 by means of intermediate sprocket-wheels 32 and chains 33. These sprocket-wheels may be of any desired relative size. So that a helper may assist in raising the division sides, handles 36 are fastened to the opposite ends of the shafts 20. A lifting-shaft 37 is journaled on said bridge-frame between and parallel with the shafts 20. This lifting-shaft carries a drum 38 above each mold E and set of cores therein. A horizontal rod 39 is suspended, by means of a cable 40, from each drum 38 and carries a series of hooks 41, which are adapted to be passed through the engaging pieces 15 on the cores. The shaft 37 has connected therewith on one end a sprocket 42, chain 43, and a handle 44, which by turning revolves the shaft 37 and winds the cables 40 upon their drums and raises the cores above the molded blocks. A ratchet-wheel 45 and dog 46 are adapted to prevent the shaft 37 reversing after the cores have been raised. After all of the sides of the mold-frame and mold-cores have been raised above the molded blocks the traveler may be moved over an empty mold-form and upon the tracks by applying hand pinch-bars (not shown) to the wheels 47 of the terminal trucks. The sides of the mold-frame and cores may then be lowered and used again in constructing a new mold-frame, while the molded blocks remain in the first form to set and to be removed from the base. The cores are placed over the mold-core holders on the base, and the sides of the mold-frame are clamped together in place upon said base after they have been lowered from the traveler. It is not necessary to remove the parting-wall 6 with the other parts of the mold-frame, though when desired it may be lifted and carried by the traveler by hooks and chains similar to those indicated by the reference-numeral 24.

Concrete or other molding material is conveyed to the mold-frames by means of a carrier H. A bucket I is detachably fastened to the carrier by means of hooks 48 and after being filled is moved to be engaged by the carrier by means of a truck 49. This truck is movable upon a track 50, which is parallel with the track 19 and adjacent thereto. The carrier has a pair of antifriction-rollers 51, which run in the grooves of a track 52, (see Fig. 2,) carried upon the bridge-frame 17 of the traveler. The bottom of the bucket has a hinged door 53, which is locked when closed by hooks 54 and is opened by releasing said hooks to permit the contents of the bucket to drop into the mold-frame. The carrier is moved back and forth upon the track 52 by means of cables 55, which are looped around pairs of rollers 56 and 57. These pairs of rollers are mounted upon shafts 58 and 59, which are journaled upon the bridge-frame. The ends of the cables 55 are fastened to collars 60 on a shaft 61, which supports the carrier H. A crank 62 is mounted upon the shaft 58, which by turning is adapted to turn the drums 56 and 57 and move the carrier. Sprocket-wheels 63 and a chain 64 are connected to the shaft 59, and a crank 65 is operatively connected with said sprocket-wheels, so that an operator stationed at the other end of the bridge-frame may move the carrier. After the mold-frame has been filled with concrete or other molding material by means of the carrier it is tamped and evened off on the top of said frame and the operation of lifting the parts of the mold-frame and moving the trucks is repeated.

The action of each pair of division-plates collapsing together as described produces a cleaner-cut block and enables the removal of the division-plates without mutilating the blocks and reduces the number of mold-frame parts necessary for manufacturing a given number of blocks.

It is obvious that the operation of molding as described is substantially continuous and that practically no time is lost in the use of the apparatus and that a large number of building-blocks may be made by a single operation, whereas with other prior art machines more hand-labor and time are necessary for manufacturing a given number of blocks.

As shown in the alternate construction, a single series of double molds is formed by a single frame 66. Track-rails 67 are laid upon the base, so that a truck 68 is adapted to move above the mold-frame. A winch 69 is carried by the truck and is operated by sprocket-wheels 70, connecting chain 71 and crank 72 to revolve drums 73 and wind cables 74 thereon. The ends of these cables are attached to a cross-bar 75, which carries a number of hooks 76 to engage and lift the cores and the division sides out of the molds D. The longitudinal sides of the mold-frame may be removed by hand and are of substantially the same construction as in the preferred form. The sides and cores removed may be placed upon the truck 68 and removed on the track 67.

It is obvious that the construction above set forth may be changed and varied without departing from the spirit of this invention, and I do not limit or confine myself to the exact construction described.

Having described my invention, what I claim as new, and desire to protect by Letters Patent, is—

1. A machine of the class set forth, comprising, in combination, a suitable base formed with a plurality of holders for mold-cores, mold-frame sides resting upon said base, mechanism above said base for lifting said sides and cores, and means for permitting said mechanism to be shifted.

2. A machine of the class set forth, comprising, in combination, a traveler, a base below said traveler having a plurality of holders for mold-cores, a plurality of mold-frame parts on said base, and means carried by said traveler for raising said mold-frame parts and cores.

3. A machine of the class set forth, comprising, in combination, a traveler, a base below said traveler having means for holding a plurality of mold-frame parts together, and means carried by said traveler for raising said parts.

4. A machine of the class set forth, comprising, in combination, a temporary mold-frame, a base for holding said mold-frame, overhead traveling mechanism adapted to separate said frame from said base, and a carrier on said traveling mechanism.

5. A machine of the class set forth, comprising, in combination with a mold frame and core, said frame having a pair of longitudinal detachable sides, a parting-wall between said sides, transverse division sides arranged in pairs across the spaces between the longitudinal sides and parting-wall to divide the same into a plurality of molds and means for permitting the transverse division sides to collapse, a base, means for holding the parts of said frame and core on said base, a traveler, and means on said traveler for withdrawing the parts of said frames.

6. A machine of the class set forth, comprising, in combination, a temporary mold-frame, a base below said frame, a bridge above said frame, means for supporting the ends of said bridge, means carried by said bridge for separating said frame and base, a carrier, and means for moving said carrier upon said bridge.

7. A machine of the class set forth, comprising, in combination, a temporary mold-frame forming a plurality of molds, a base below said frame, means for separating said frame and base and carrying the parts removed away from the molded blocks, and means for carrying molding material to said molds.

8. A machine of the class set forth, consisting, in combination, of a traveler, a base, below said traveler, provided with means for holding mold-cores, a frame, surrounding said cores, adapted to form a plurality of molds on said base, means on said traveler for lifting said frame, means also on said traveler for lifting said cores, and a carrier coöperating with said traveler for conveying molding material to said frame.

9. A machine of the class set forth, consisting, in combination, of a traveler, a base below said traveler, mold-frame sides on said base, means for detachably holding said sides together on said base to form a mold, means on said traveler for removing said sides, and a carrier movable upon said traveler for molding material.

10. A machine of the class set forth, consisting, in combination, of a base having means for holding a mold-frame, a traveler having means for permitting the same to be shifted above said base, means on said traveler for lifting said mold-frame, means for holding said mold-frame in superior position, and means coöperating with said traveler for carrying molding material to said mold-frame.

11. A machine of the class set forth, consisting, in combination, of a mold-frame, a base adapted to support, and formed with a core-holder in, said frame, a traveler for removing said frame from said base, means for permitting said frame to be returned to said base, and a carrier coöperating with said traveler for conveying molding material to said frame.

12. A machine of the class set forth, consisting, in combination, of a traveler, a base below said traveler, a mold-frame resting on said base, means carried by said traveler for engaging and lifting said mold-frame, means for holding said mold-frame in superior position, and means on said traveler for conveying molding material to said frame.

13. A machine of the class set forth, consisting, in combination, of a traveler, a base below said traveler, a mold-frame, means on said base for holding said mold-frame, means carried by said traveler for lifting parts of said mold-frame, a carrier, and means for moving said carrier on said traveler.

14. A machine of the class set forth, consisting, in combination, of an overhead traveler, a base below said traveler, mold-frame sides and cores on said base, means on said base for holding said sides and cores to form a mold, means on said traveler for removing said sides and cores, a carrier, and means for moving said carrier on said traveler.

15. A machine of the class set forth, comprising, in combination, a temporary mold-frame, a base, means for holding the parts of said mold-frame on said base, a traveler above said base, means for lifting the parts of said mold-frame on said traveler, and a carrier for molding material on said traveler.

16. A machine of the class set forth, comprising, in combination, a temporary mold-frame, a base for holding said mold-frame, a traveler above said mold-frame, means on said traveler for removing said mold-frame, a carrier, means for moving said carrier above said mold-frame, and means for dumping the molding material out of said carrier.

17. A machine of the class set forth, comprising, in combination, a temporary mold-frame, a core, a base having means for holding said frame and core, a traveler having means to permit the same being moved above said base, means on said traveler for removing said frame and core, a carrier on said traveler, and means for moving said mold-frame above said base.

18. A machine of the class set forth, comprising, in combination, a temporary mold-frame, a base for holding said mold-frame, a carrier above said base, means for moving said carrier, a bucket, and means for detachably holding said bucket on said carrier.

19. A machine of the class set forth, comprising, in combination with a temporary mold frame and core, a base having means for holding said frame and core, a traveler having means to permit the same being moved above said base, means on said traveler for lifting said frame and core, a carrier, means for moving said carrier on said traveler, a bucket, means for detachably connecting said bucket to said carrier, and means for emptying said bucket.

20. A machine of the class set forth, comprising, in combination, a temporary mold-frame, a base having means for holding said frame, a traveler having means to permit the same being moved above said mold-frame, means on said traveler for lifting said frame, a carrier, a track on said traveler, and means for moving said carrier upon said track.

21. A machine of the class set forth, comprising, in combination, a temporary mold-frame, a base having means for holding said frame, a traveler above said base, means on said traveler for lifting the parts of said frame, a carrier, and a track upon which said carrier is adapted to move upon said traveler.

22. A machine of the class set forth, comprising, in combination, a temporary mold-frame, a base for holding said mold-frame, a traveler above said mold-frame, means on said traveler for removing said mold-frame, a carrier, and means for moving said carrier.

23. A machine of the class set forth, comprising, in combination with a base provided with means for holding the parts of a mold-frame, sides and a core forming said mold-frame, a bridge above said mold-frame, a truck under each end of said bridge, and means on said bridge for lifting and holding said sides and core suspended, for the purposes specified.

24. A machine of the class set forth, comprising, in combination with a base formed with means for holding the parts of a mold-frame, detachable sides adapted to form a mold, trucks adapted to move on said base, an overhead bridge between said trucks and above said mold-frame, and means carried by said overhead bridge for raising said sides and for carrying molding material to said mold-frame.

25. A machine of the class set forth, comprising, in combination with a base, a mold-frame upon said base, an overhead bridge above said mold-frame, trucks for supporting said bridge, means carried by said bridge for raising said mold-frame, and a carrier on said bridge for molding material.

26. A machine of the class set forth, comprising, in combination with a base, a mold-frame upon said base, an overhead bridge above said mold-frame, trucks below said bridge, shafts carried by said bridge, drums upon said shafts, cables carried by said drums for lifting said mold-frame, and means for revolving said shafts.

27. A machine of the class set forth, comprising, in combination with a suitable base, sides on said base adapted to form a mold, an overhead bridge, trucks below said bridge, tracks upon said base upon which said trucks are adapted to run, a plurality of hoisting-drums on said frame for raising the sides of said mold-frame, and means for revolving said drums and holding said sides elevated.

28. A machine of the class set forth, comprising, in combination with a suitable base, sides on said base adapted to form a mold-frame, an overhead bridge, trucks below said bridge, tracks upon which said trucks are adapted to run, a plurality of hoisting-drums upon said bridge, means for revolving said drums and for holding said sides in elevated position, a carrier upon said bridge, and a bucket upon said carrier.

29. A machine of the class set forth, consisting, in combination with a suitable base formed with core-holders, of mold-frame sides on said base, cores upon said holders, an overhead bridge above said mold-frame sides, trucks below said bridge, hoisting-drums upon said bridge for raising said mold-frame sides and cores, means for revolving said drum, and means for holding said sides and cores in elevated position.

30. A machine of the class set forth, consisting, in combination, of a suitable base formed with core-holders, mold-frame sides upon said base, cores upon said holders, an overhead bridge, trucks below said bridge, a plurality of hoisting-drums carried by said bridge for raising said sides and cores, means for revolving said drums, means for holding said sides and cores in elevated position, a track upon said bridge, a carrier adapted to travel upon said track over the mold-frame, and means for moving said carrier.

31. A machine of the class set forth, consisting, in combination with a base formed with core-holders, of mold-frame sides on said base, cores between said sides and on said holders, an overhead bridge, trucks below said bridge, a track upon said bridge, and a carrier for molding material adapted to travel upon said track.

32. A machine of the class set forth, consisting, in combination with a suitable base formed with core-holders, of mold-frame sides resting upon said base, cores between said sides and on said holders, an overhead bridge, trucks below said bridge, a track on said bridge, a carrier for molding material adapted to travel upon said track, and means for moving said carrier.

33. A machine of the class set forth, comprising, in combination with a suitable base formed with core-holders, mold-frame sides on said base, cores between said sides and on said holders, an overhead bridge, trucks below said bridge, a track on said bridge, a carrier adapted to travel upon said track, means for moving said carrier, a detachable bucket on said carrier, and a truck below said bucket adapted to support the same when detached from said carrier.

34. A machine of the class set forth, consisting, in combination with a suitable base formed with core-holders, mold-frame sides on said base, cores between said sides and on said holders, an overhead bridge, trucks below said bridge, means carried by said bridge for raising said sides and cores and for holding them in elevated position, a track carried by said bridge, a carrier adapted to travel on said track, a detachable bucket on said carrier, means for moving said carrier, a truck adapted to support said bucket when detached from said carrier, and parallel tracks on said base for all of said trucks to run upon.

In testimony whereof I have signed my name to this specification in the presence of two subscribing witnesses.

ALEXANDER A. FORBES.

Witnesses:
 E. M. BOESEL,
 F. G. BRADBURY.